United States Patent [19]

Scaramucci

[11] 4,373,542
[45] Feb. 15, 1983

[54] FIRE SAFE DISC VALVE

[76] Inventor: Domer Scaramucci, 3245 S. Hattie, Oklahoma City, Okla. 73129

[21] Appl. No.: 198,540

[22] Filed: Oct. 20, 1980

Related U.S. Application Data

[62] Division of Ser. No. 865,853, Dec. 30, 1977, Pat. No. 4,249,555.

[51] Int. Cl.³ .............................................. F16K 1/20
[52] U.S. Cl. ...................................... 137/72; 137/74; 251/306; 251/308
[58] Field of Search ..................... 137/72, 74, 375; 251/306, 308

[56] References Cited

U.S. PATENT DOCUMENTS

| | | | |
|---|---|---|---|
| 2,930,576 | 3/1960 | Sanctuary | 251/315 X |
| 3,174,495 | 3/1965 | Anderson | 137/74 |
| 3,177,887 | 4/1965 | Priese | 137/74 |
| 3,540,691 | 11/1970 | Suell | 251/306 X |
| 3,591,133 | 7/1971 | Miley | 251/308 X |
| 3,642,247 | 2/1972 | Scaramucci | 251/306 X |
| 4,227,675 | 10/1980 | Sutter | 251/306 X |

Primary Examiner—Harold W. Weakley
Attorney, Agent, or Firm—Dunlap & Codding

[57] ABSTRACT

A fire safe disc valve comprising a valve body having a flow passageway therethrough, a disc shaft rotatably mounted in the flow passageway and a disc mounted on the disc shaft, the disc being rotatable to and from a position normally closing the flow passageway by sealingly engaging a disc sealing member. An operating stem, extending through a stem operating aperture in the valve body, engages the disc shaft for rotation thereof, and an elastomeric packer seals the aperture about the operating stem. The disc shaft is displaceable along the flow passageway whereby the disc will close the passageway if the disc sealing member is destroyed, and the operating stem is axially displaceable in the stem operating aperture whereby the aperture is sealed by fluid pressure pressing the operating stem against a stem sealing seat if the stem packer is destroyed.

18 Claims, 9 Drawing Figures

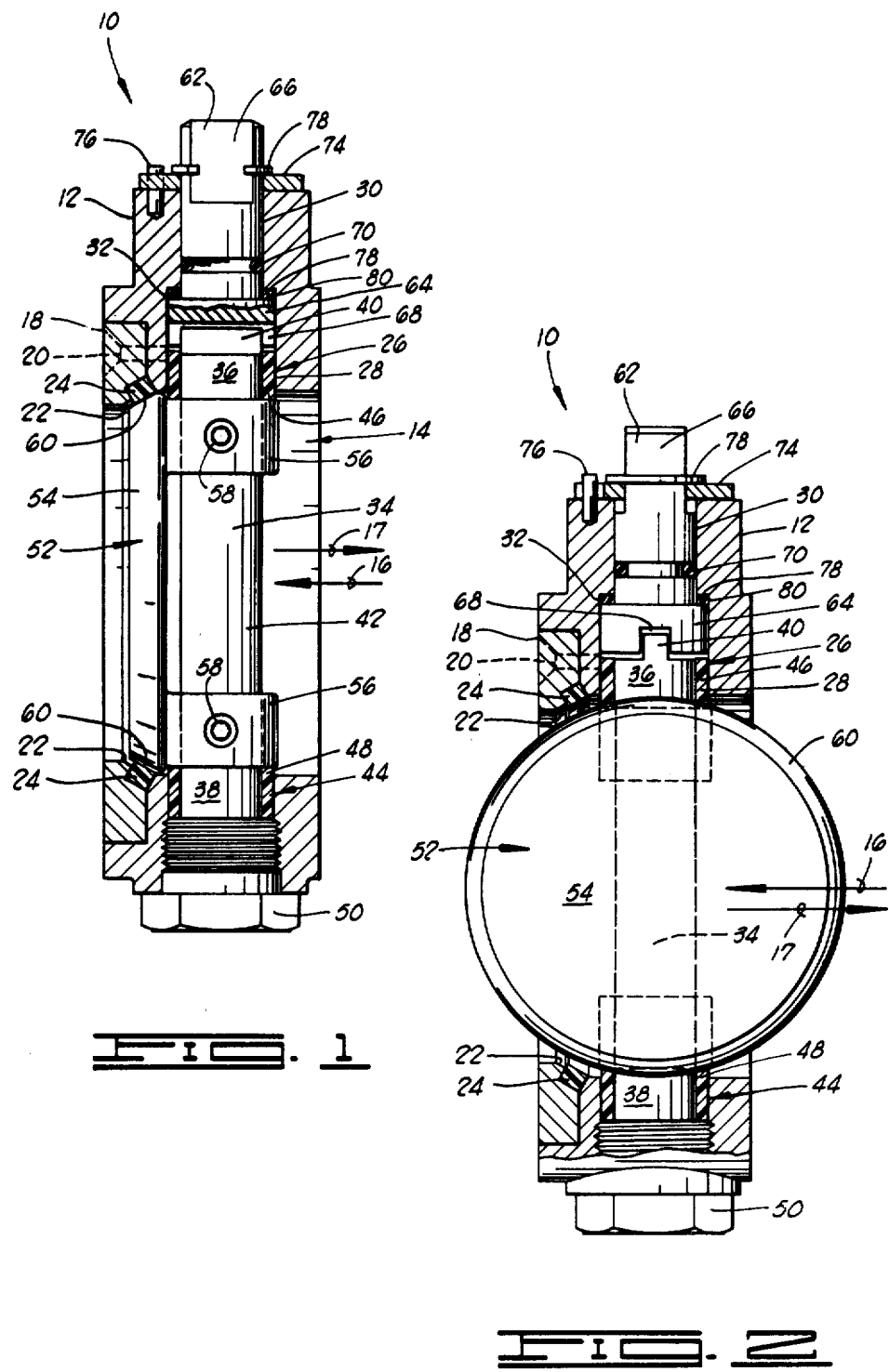

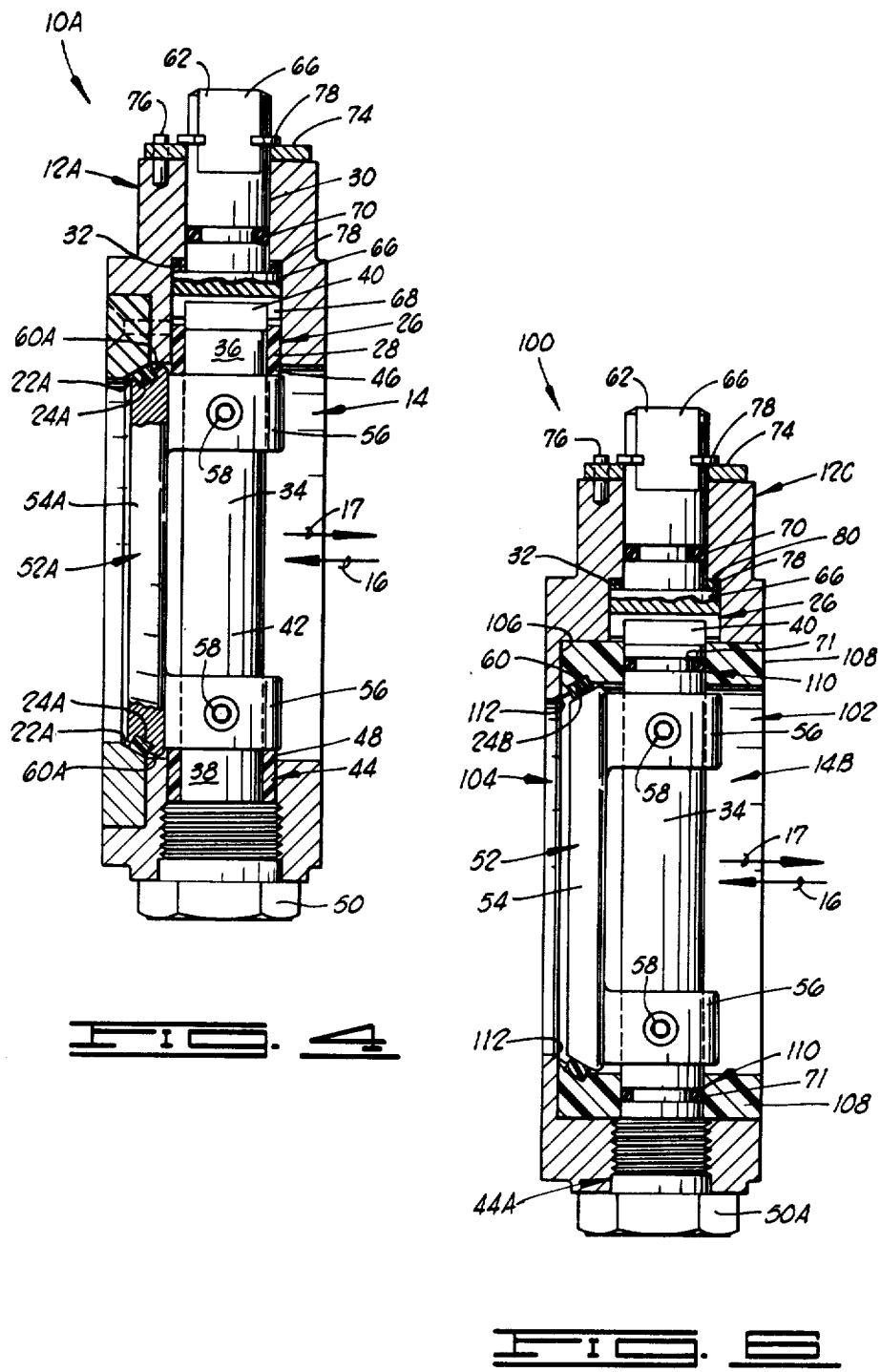

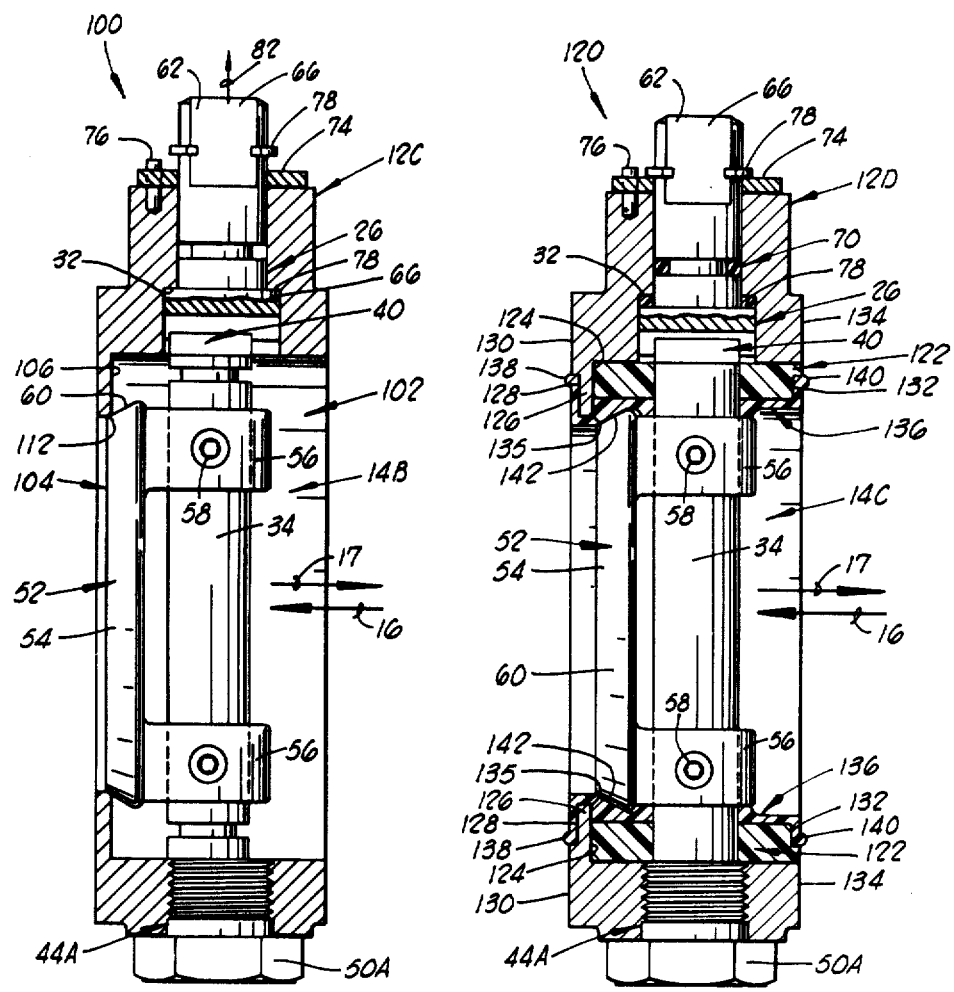
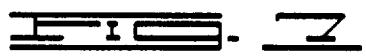 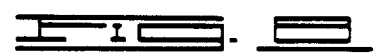
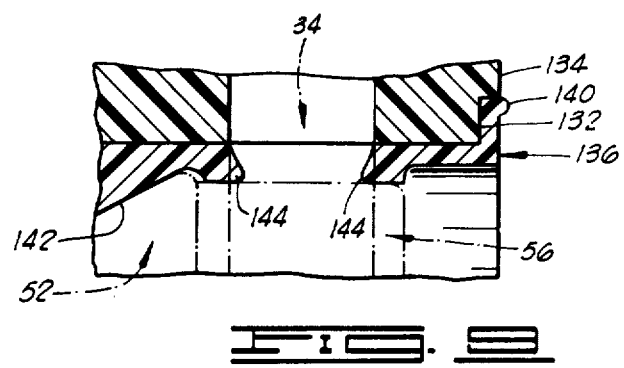

4,373,542

FIRE SAFE DISC VALVE

This application is a division of application Ser. No. 865,853, filed Dec. 30, 1977, now U.S. Pat. No. 4,249,555.

BACKGROUND OF INVENTION

1. Field of the Invention

The present invention relates to improvements in fluid flow control valves, and more particularly but not by way of limitation, the invention relates to self sealing valves.

2. Discussion of the Prior Art

U.S. Pat. No. 3,815,869, issued to Smith, presents a means of sealing a flow passageway in the event that the sealing member is destroyed, a feature also present in U.S. Pat. No. 3,642,247, issued to Scaramucci, the present applicant. The Smith patent teaches the limited displacement of a butterfly disc under fluid pressure to close the flow passageway if the seal member is destroyed. However, the circumstances that would destroy the seal member would also cause the packer about the disc shaft to be destroyed, and the Scaramucci valve effects the same fire safe result.

Neither of the above patents mentions the intended problem of fluid leakage from the operating stem aperture in the event the valve seals and packers are destroyed. This means that fluid would still escape the confines of the valve even after the flow passageway is closed by the butterfly disc.

SUMMARY OF INVENTION

The present invention provides a fire safe disc valve that has a valve body characterized as having a flow passageway therethrough, an annular flow sealing seat facing upstream of the flow passageway, and a stem operating aperture disposed through the wall of the valve body. A disc shaft, disposed across the flow passageway, has one of its ends disposed in the stem operating aperture, said end being engageable by an operating stem that is rotatably mounted, and sealed by a stem packer, in the stem operating aperture. A disc, having an annular flow sealing face, is supported by the disc shaft for rotation to and from a passage sealing position in which the disc and valve body sealingly engage an elastomeric ring seal therebetween. The disc shaft has limited displacement in a downstream direction along the flow passageway in the event that the ring seal and the stem packer are destroyed, in which event the flow passageway is sealed by the sealing together of the annular sealing face of the disc and the annular flow sealing seat of the valve body. The operating stem has limited axial displacement toward a stem sealing seat positioned in the stem operating aperture when the stem packer is destroyed, the stem operating aperture being sealed by fluid pressure acting to press the operating stem against the stem sealing seat.

It is an object of the present invention to provide a fire safe disc valve which is capable of completely self-sealing itself in the event of seal and packing material failure.

It is yet another object of the present invention to provide a fire safe disc valve which is economical to manufacture, which offers ease of assembly, and which requires a minimum in upkeep expense.

Other objects, features and advantages of the present invention will become apparent from the following detailed specification when read in conjunction with the attached drawings and appended claims.

BRIEF DESCRIPTION OF THE DRAWINGS

FIG. 1 is a side elevational view in partial cross section and cut away detail of a fire safe disc valve constructed in accordance with the present invention. This view shows the butterfly disc positioned to close the flow passageway.

FIG. 2 is a view similar to that of FIG. 1 with the exception that the butterfly disc is shown in the passage opening position in which the passageway is open for fluid flow.

FIG. 4 is a side elevational view in partial cross section and cut away detail of another embodiment of the present invention.

FIG. 6 is a side elevational view in partial cross section and cut away detail of yet another embodiment of the present invention.

FIG. 7 is a view showing the fire safe disc valve of FIG. 6 after the seals and packing material thereof have been destroyed.

FIG. 8 is a side elevational view in partial cross section and cut away detail of one other embodiment of the present invention.

FIG. 9 is an enlarged view of a portion of the disc shaft seal of FIG. 8 before the disc shaft is assembled to the valve body.

DESCRIPTION OF THE EMBODIMENT OF FIGS. 1 THROUGH 3

Figures 3, 5:
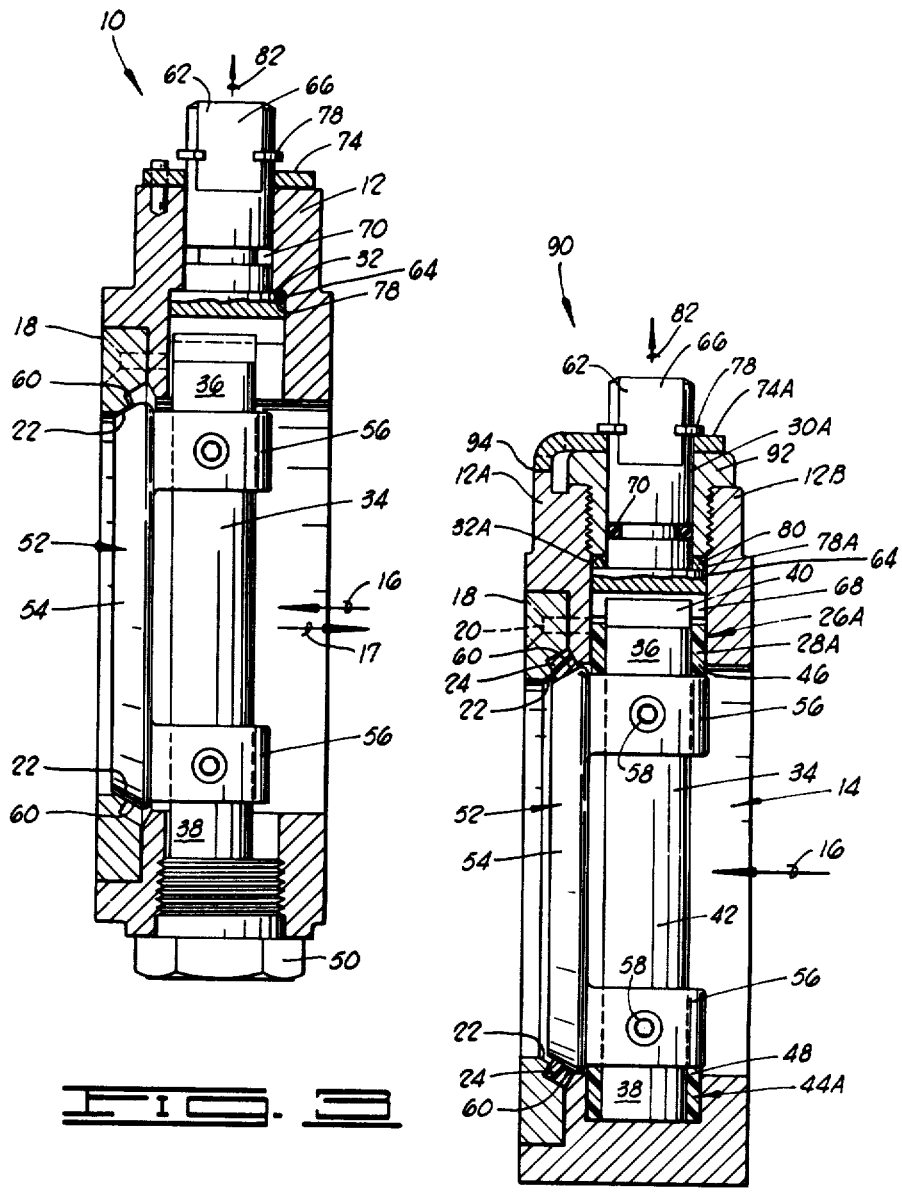
FIG. 3 is a view showing the fire safe disc valve of FIG. 1 after the seals and packing material thereof have been destroyed.
FIG. 5 is a side elevational view in partial cross section and cut away detail of another embodiment that is similar to the embodiment shown in FIG. 1.

Referring to FIGS. 1 through 3 generally, and with specific reference to FIG. 1, shown therein in partial cross sectional and cut away detail is a fire safe disc valve 10 constructed in accordance with the present invention. For convenience, like numerals indicating common components will appear in all of the figures.

The fire safe disc valve 10 comprises a valve body 12 which has a flow passageway 14 therethrough for the passage of a pressurized fluid in the direction indicated by the arrow designated by the numeral 16. The valve body 12 has an annular ring seat member 18 that is attachable by bolts 20 and which has an annular flow sealing seat 22 concentric with the cross section of the passageway 14, the flow sealing seat 22 facing the passageway 14 in the upstream direction 17 which is against the fluid flow in the flow passageway 14. The purpose of the flow sealing seat 22 will be made clear below.

The ring seat member 18 also supports an annular ring seal 24 that is made of an elastomeric material and which is disposed concentrically to the cross section of the flow passageway 14. While the ring seal 24 provides for positive sealing of the fluid, it is known that such sealing members are destroyed when the valve 10 is subjected to the extremely high temperatures experienced in a fire.

The valve body 12 has a stem operating aperture 26 that extends through the wall of the valve body 12 and has fluidic communication both with the flow passageway 14 and externally to the valve body. The stem operating aperture 26 has a first aperture portion 28 and a second aperture portion 30, the internal diameter of the first aperture portion 28 being greater than the internal diameter of the second aperture portion 30 such that a stem sealing seat 32 is formed by the shoulder therebetween. The stem sealing seat 32 faces toward the flow passageway 14.

The fire safe disc valve 10 also is provided with a disc shaft 34 that has a first end 36 and a second end 38. The disc shaft 34 is preferably a cylindrical rod shaped member having the extreme portion of the first end 36 formed in the shape of a tongue member 40 extending from the body of the disc shaft proper. As shown in FIG. 1, the first end 36 is generally disposed in the stem operating aperture 26, and a disc supporting portion 42 of the disc shaft 34 is positioned across the flow passageway 14. A bearing aperture 44 is provided in the valve body 12 for the support of the second end 38 of the disc shaft 34. Annular stem packers 46 and 48 are disposed respectively in the stem operating aperture 26 and in the bearing aperture 44 to provide bearing support for, and to seal about, the disc shaft 34.

The bearing aperture 44 extends through the wall of the valve body 12 to communicate externally thereto, so that the disc shaft 34 can be assembled in the valve body 12 by passing it through the bearing aperture 44. A portion of the internal wall of the bearing aperture 44 is threaded and a plug 50 is provided to seal the aperture 44.

A butterfly disc 52 comprising a disc plate 54 is attached to the disc supporting portion 42 of the disc shaft 34 by a pair of loop connectors 56 that extend from the disc plate 54, the loop connectors 56 having axially aligned apertures through which the disc shaft 34 is passable. The disc 52 is locked into its position by means of the set screws 58.

By rotating the disc shaft 34, the disc 52 is rotated to and from a position closing the flow passageway 14. That is, the disc is positionable in a passage sealing position, as shown in FIG. 1, in which the disc 52 is positioned across the flow passageway, and in a passage opening position, as shown in FIG. 2, in which the disc 52 is positioned along the flow axis of the passageway. The disc plate 54 has an annular flow sealing face 60 that faces the flow sealing seat 22 in the downstream direction 16. The annular flow sealing face 60 is caused to sealingly engage the resilient ring seal 24 when the disc 52 is in the passage sealing position shown in FIG. 1.

To provide for the rotating of the disc shaft 34, an operating stem 62, having a shaft engaging end 64 and an operating end 66, is disposed in the stem operating aperture 26. The shaft engaging end 64 is generally cylindrically shaped and sized to be rotatably disposed in the first aperture portion 28. A tongue engaging channel 68 is disposed across the shaft engaging end 64, the channel being sized to loosely engage the tongue 40 of the disc shaft 34 as shown in FIG. 2, the tongue 40 being slidable along the channel 68 for a reason that will become clear below. The tongue 40 and the tongue engaging channel 68 are oriented to permit the downstream displacement (along the direction 16) of the disc shaft 34 when the disc 52 is in the passage sealing position shown in FIG. 1.

The operating end 66 of the operating stem 62 is generally shaped and sized to be rotatably supported in the second aperture portion 30, and is sealed by a groove and O-ring arrangement 70. The distil portion of the operating end 64 of the operating stem 62 is flatted to permit the connecting thereto of an operating handle or wrench for selectively turning the operating stem 62 to effect the positioning of the disc 52. A retaining ring 74 is fitted over the flatted end 72 and attached to the valve body 12 by means of the bolt 76. A seal clip 78, serving as a dust seal, is wedged onto the flatted end 78 to cover the aperture of the retaining ring 74.

The step down in diameter between the stem engaging end 66 and the operating end 64 of the operating stem 62 forms a shoulder portion 78 that serves as a stem sealing face that faces toward the stem sealing seat 32. The purpose of the stem sealing face 78 will be made clear below. It may be desirable to place a spacer ring 80, made of the same resilient bearing material from which the stem packers 46, 48 are made, in the space between the stem sealing face 78 and the stem sealing seat 32 as shown in FIGS. 1 and 2.

As will be clear from the above description, the present invention provides a butterfly disc flow valve that is easily assembled, as all internal parts of the fire safe disc valve 10 are readily positionable in the spatial positions occupied in the assembled mode of the valve 10, including the disc 52 which is positionable through the flow passageway 14. Also, it will be recognized that distortion of the valve body that occurs as one of the problems occasioned with manufacturing tolerances is practically eliminated by the free coupling established between the disc shaft 34 and the operating stem 62.

While the above are important considerations, the present invention achieves its self sealing characteristics in the following described manner. As shown in FIG. 1, the flow passageway 14 is normally sealed when the disc 52 is positioned in the passage sealing position in which the annular flow sealing face 60 of the disc 52 sealingly engages the annular resilient ring seal 24. However, in the event that the fire safe disc valve 10 is subjected to seal failure conditions that destroy the annular ring seal 24 and the stem packers 46, 48, such as when extremely high temperatures are experienced in a fire, the fire safe disc valve 10 will be sealed in the manner depicted in FIG. 3, which shows the fire safe disc valve 10 absent the ring seal 24 and all the packing seal members that are normally disposed in the stem operating aperture 26.

As shown in FIG. 3, fluid flow in the passageway 14 is sealed by the sealing together of the annular flow sealing face 60 of the disc 52 and the annular flow sealing seat 22 of the valve body 12. This sealing position of the disc 52 is effected by fluid pressure that acts on the disc, and is possible because of the limited downstream displacement of the disc shaft 34 when the stem packers 46, 48 are no longer present to support the ends of the disc shaft 34. Also, because of the tongue and groove coupling between the disc shaft 34 and the operating stem 62, the disc shaft 34 is unrestricted in its movement toward the annular flow sealing seat 22 supported by the valve body 12.

The fire safe disc valve 10, under the seal failure conditions described above, also operates to prevent fluid leakage from around the operating stem 62 and out the stem operating aperture 26 in the following manner. The conditions that served to destroy the ring seal 24 also would destroy the stem packer members 46, 48 and the O-ring in the O-ring assembly 70, as well as the spacer ring 80, if provided. When this has occured, it will be clear from FIG. 3 that the operating stem 62 will have limited freedom to be displaced axially in the direction 82 toward the stem sealing seat 32 and will be displaced accordingly by the force of fluid pressure on the stem engaging end 64. This displacement effects the sealing off of the stem operating aperture 26 to the fluid by the sealing engagement of the stem sealing face 78 of the operating stem 62 and the stem sealing seat 32 of the valve body 12.

DESCRIPTION OF THE EMBODIMENT OF FIG. 4

When the ring seal 24 is shown in FIGS. 1 through 3 as being supported by the valve body 12, it will be clear that an equivalent structure is that in which the ring seal is supported by the disc to engage an annular flow sealing seat provided on the valve body, such as shown in FIG. 4. The fire safe disc valve 10A shown in FIG. 4 is essentially identical to the fire safe disc valve 10 of FIG. 1 with the exceptions now to be noted. For convenience, like numerals will be used in FIG. 4 for identical components to those that appear in FIG. 1, and in the interest of brevity, the description for the embodiment shwon in FIG. 1 will be sufficient except as here modified.

The valve body 12A of the fire safe disc valve 10A has a flow passageway 14 therethrough and an annular flow sealing seat 22A that faces the passageway in the upstream direction 17. A ring seal 24A is supported in an annular groove that is disposed in the downstream facing, annular flow sealing face 60 that is located on the disc plate 54A of the disc 52A that is supported by the disc shaft 34. The ring seal 24A is disposed to extend beyond the flow sealing face 60A so as to sealingly engage with the flow sealing seat 22 to close the flow passageway 14 when the disc 52A is in the passage sealing position.

It will be clear that the fire safe aspect of the fire safe disc valve 10A is the same as that which has been described above for the fire safe disc valve 10 of FIG. 1. That is, in the event of a fire that destroys the seals and packing members, the disc shaft 34 will be displaced in the downstream direction 16 by the force of the fluid pressure acting on the disc 52A, effecting the sealing of the flow passageway 14 via the sealing engagement of the flow sealing seat 22A and the flow sealing face 60A. Of course, the sealing of the stem operating aperture 26 is effected in the same manner as has been described above in relation to FIG. 1.

DESCRIPTION OF THE EMBODIMENT OF FIG. 5

An alternate embodiment of the present invention is shown in FIG. 5, which shows a fire safe disc valve 90 constructed very similarly to the fire safe disc valve 10, with the exception that the stem operating aperture is sized to permit the passage of the disc shaft therethrough, eliminating the need for extending the bearing aperture completely through the wall of the valve body. Similar components of the valve 90 are identified in FIG. 5 with like numerals that are utilized for the valve 10, and such like components need not be further described.

The fire safe disc valve 90 has a valve body 12B that has a bearing aperture 44A that extends into the wall of the valve body 12B, but which does not extend therethrough. The end 38 of the disc shaft 34 is bearingly supported in the bearing aperture 44A via the stem packer 48.

The stem operating aperture 26A extends through the wall of the valve body 12B and is partially threaded to receive a bushing 92 therein. The bushing 92 has an aperture or bore 30A that serves as a portion of the stem operating aperture to rotatably retain the operating end 64 of the operating stem 62 in the same manner as that which was described hereinabove for the second aperture portion 30 of the valve 10. The lower external end of the bushing 92 serves as a stem sealing face 78A which corresponds to the stem sealing face 78 described above. A retaining ring member 74A is provided to correspond to the retaining ring member 74 above, the retaining ring member 74A being attached to the valve body 12B by brazing or the like at the tab edge 94.

The operation of the fire safe disc valve 90 is identical to that of the fire safe disc valve 10 and need not be described further. It will be clear that the bushing arrangement in the stem operating aperture 26A of the valve 90 eliminates the need for a plug to seal the bearing aperture 44A, and that the assembly of the valve 90 is achieved by positioning the disc shaft 34 through the stem operating aperture 26A before the bushing 92 is assembled to the valve body 12B.

DESCRIPTION OF THE EMBODIMENT OF FIGS. 6 AND 7

Referring to FIGS. 6 and 7, shown therein is another embodiment of the present invention as depicted by the fire safe disc valve 100 shown therein. The valve 100 is very similar in construction detail to the valve 10, except as will now be noted. Again, like numerals will be used to indicate like components to those described hereinabove.

The fire safe disc valve 100 has a valve body 12C that has a flow passageway 14B therethrough, the flow passageway 14B being formed by the joining together of a first bore 102 and a second bore 104, the second bore 104 having a diameter less than that of the first bore 102 so that a shoulder 106 is formed therebetween. An elastomeric sleeve bearing 108 is disposed to fit in the first bore 102 and abut against the shoulder 106. A pair of diametrally opposed bearing apertures 110 are aligned to each receive one end of the disc shaft 34 as shown in FIG. 6, and an O-ring arrangement 71 may be provided as an additional seal about the disc shaft 34.

The shoulder 106 has an edge that is beveled to form an annular flow sealing seat 112 (corresponding to the sealing seat 22 of the valve 10) that faces the flow passageway 14B in the upstream direction 17.

The sleeve bearing 108 supports an elastomeric ring seal 24B (corresponding to the ring seal 24 of the valve 10) disposed to sealingly engage with the annular flow sealing face 60 when the disc 52 is rotated to the passage sealing position as shown in FIG. 6. As above described, the stem operating aperture 26 containing the operating stem 62 is sealed via the O-ring arrangement 70.

The valve body 12C has a threaded access aperture 44A, provided for the purpose of permitting the passage therethrough of the disc shaft 34 during assembly. A plug 50A is provided to seal the access aperture 44A once the disc shaft 34 is properly positioned.

In the same manner as described above, the disc shaft 34 has the potential for limited downstream displacement in the direction 16 in the event of the destruction of the sealing and packing members. This condition is shown in FIG. 7, which depicts the valve 100 following the removal by fire or the like of the sleeve bearing 108, the ring seal 24B and the O-rings 70 and 71. The flow passageway 14B of the valve 100 is sealed in FIG. 7 by the engagement of the flow sealing seat 60 of the disc 52 with the flow sealing seat 112 of the valve body 12C, which is the consequence of the downstream displacement of the disc 50 that is supported by the disc shaft 34. Also, the operating stem aperture 26 is sealed in FIG. 7 via the axial displacement of the operating stem 62 in the direction 82 by the operation of fluid pressure on the operating end 66 of the operating stem.

DESCRIPTION OF THE EMBODIMENT OF FIGS. 8 AND 9

Shown in FIG. 8 is yet another embodiment of the present invention. A fire safe disc valve 120 is depicted in FIG. 8 that is substantially identical with the fire safe disc valve 100 that is shown in FIG. 7, except as will now be pointed out, and once more, like components to those described hereinabove will be designated by like numerals.

The fire safe disc valve 120 has a valve body 12D that has a flow passageway 14C therethrough, the passageway 14C being fitted with an elastomeric sleeve bearing 122 (corresponding to the sleeve bearing 108 of the valve 100) that abuts a shoulder 124. The shoulder 124 is formed by an annular ridge member 126 that extends into the flow passageway 14C as a portion of the valve body 12D. The ridge member 126 also has a surface 128 that is recessed from the outer surface 130 of the valve body 12D; and at the other edge of the sleeve bearing 122, an edge surface 132 is recessed from the outer surface 134 of the valve body 12D. The ridge member 126 has an edge that serves as an annular flow sealing seat 135 (corresponding to the sealing seat 112 of the valve 100 of FIG. 6) that faces the upstream direction 17.

The fire safe disc valve 120 has an elastomeric ring seal sleeve 136 that is a one piece member forming a bushing like sleeve that is attached to the inner surface of the sleeve bearing 122, thereby sealing the sleeve bearing 122 from exposure to the fluid in the flow passageway. Also, the ring seal sleeve 130 is shaped to fit snugly around the ridge member 126 as shown in FIG. 8 so as to fit over and cover the shoulder surface 124 and the recessed surface 128. The ring seal sleeve 136 also covers the recessed edge surface 132 of the sleeve bearing 122. One edge of the ring seal sleeve forms an annular flange bead 138 that extends beyond the outer surface 130 of the valve body 12D, and an annular flange bead 140 that extends beyond the outer surface 134.

As shown in FIG. 8, the ring seal sleeve 136 forms an annular sealing seat 142 that faces the flow passageway in the upstream direction 17, the sealing seat 142 being sealingly engaged by the flow sealing face 60 of the butterfly disc 52 when the disc 52 is rotated to the passage closing position.

In the fire safe disc valve 100 that was described above (FIG. 6), additional sealing about the disc shaft 34 was provided by the O-ring 70. In the fire safe disc valve 120 of FIG. 8, sealing about the disc shaft 34 is accomplished as shown in FIG. 9, which is an enlarged view of a portion of the sleeve ring seal 136 with the disc shaft 34 removed. The ring seal sleeve 136 has a shaft sealing bead 144 that protrudes as a lip into the aperture that receives one end of the disc shaft 34 in the assembled mode thereof. Since the ring seal sleeve 136 is made of an elastomeric material, the insertion of one of the ends of the disc shaft 34 into the aligned apertures of the sleeve bearing 122 and the ring seal sleeve 136 effects the compression of the bead 144 to create a tight seal about the disc shaft 34, thereby preventing fluid in the flow passageway from contacting the sleeve bearing 122. Of course, while FIG. 9 depicts the ring seal sleeve at only one end of the disc shaft 34, it will be understood that this sealing feature is also accomplished at the other end of the disc shaft 34 when assembled to the valve body 12D.

A view is not provided of the fire safe disc valve 120 with the seals and packing materials removed such as by destruction in a fire, because the operation of the fire safe disc valve 120 is similar to the other embodiments of the present invention that have been described hereinabove. In like manner thereto, the disc shaft 34 as disposed in the fire safe disc valve 120 has the potential for limited downstream displacement by the operation of fluid pressure on the disc 52 in the event that the sleeve bearing 122 and the ring seal sleeve 136 are destroyed, in which case the sealing of the flow passageway 14C is effected by the engagement of the flow sealing seat 135 disposed on the ridge member 126 with the flow sealing face 60 disposed on the butterfly disc 52. Further, the stem operating aperture 26 will be sealed in the manner described hereinabove.

The flange beads 138 and 140 of the fire safe disc valve 120 serve as flange seals between the valve body 12C and members that are connected thereto. That is, for example, the flange beads 138 and 140, being of compressible elastomeric material, serve to replace or augment gasket seals between the fire safe disc valve 120 and conduits that are connected via bolt holes that are not shown in the figures.

It is clear that the present invention is well adapted to carry out the objects and attain the ends and advantages mentioned as well as those inherent therein. While presently preferred embodiments of the invention have been described for purposes of this disclosure, it will be appreciated that numerous changes may be made which will readily suggest themselves to those skilled in the art and which are encompassed within the spirit of the invention disclosed and as defined in the appended claims.

What is claimed is:

1. A fire safe disc valve, comprising:
   a valve body having a flow passageway therethrough and having an annular flow sealing seat, the valve body having a stem operating aperture disposed in a wall thereof and communicating with the flow passageway, and the valve body having an annular stem sealing seat facing the flow passageway and disposed in the stem operating aperture;
   an operating stem rotatably supported in the stem operating aperture and having an operating end and a stem engaging end, the operating stem having an annular stem sealing face facing the stem sealing seat;
   a disc shaft having a first end portion disposed in the stem operating aperture and a disc supporting portion disposed in the flow passageway, the first end portion of the disc shaft engageable with the stem engaging end of the operating stem so that rotation of the operating stem effects rotation of the disc shaft;
   packing means supported by the valve body for providing bearing support for the first end portion of the disc shaft, the operating stem having limited axial displacement toward the stem sealing seat under fluid pressure on the stem engaging end in the event the packing means is destroyed, the packing means characterized as comprising:
- a sleeve bearing supported by the valve body in the flow passageway, the sleeve bearing having a pair of diametrally opposed bearing apertures, each of said bearing apertures supporting one end of the disc shaft;
- a disc supported by the disc supporting portion of the disc shaft in the flow passageway of the valve body, the disc positionable by rotation of the disc shaft in a passage sealing position and in a passage opening position, the disc having an annular flow sealing face facing the annular flow sealing seat when the disc is in the passage sealing position; and
- disc sealing means for sealing the flow passageway between the disc and the annular flow sealing seat when the disc is in the passage sealing position, the disc shaft having limited downstream displacement under the pressure of fluid in the flow passageway in the event the annular stem packer and the disc sealing means are destroyed so that the flow passageway is sealed by sealing together of the annular flow sealing face of the disc and the annular flow sealing seat of the valve body.

2. The valve of claim 1 further comprising an O-ring seal disposed in the disc shaft cooperatively with the sleeve bearing sealing against fluid flow through the bearing aperture to the stem operating aperture.

3. The valve of claim 1 wherein the disc sealing means comprises an elastomeric ring seal supported by the sleeve bearing to sealingly engage the disc in the passage sealing position thereof.

4. The valve of claim 1 wherein the disc sealing means comprises an elastomeric ring seal sleeve supported by the inner surface of the sleeve bearing in the flow passageway, the ring seal sleeve forming an annular sealing seat facing the flow passageway to sealingly engage the disc in the passage sealing position thereof.

5. The valve of claim 4 wherein the ring seal sleeve is further characterized as forming an annular flange bead disposed to serve as a flange for the valve body.

6. The valve of claim 4 wherein the ring seal sleeve is further characterized as forming a shaft sealing bead disposed to seal against the disc shaft preventing fluid in the flow passageway from contacting the sleeve bearing.

7. A fire safe disc valve, comprising:
- a valve body having a flow passageway therethrough and having an annular flow sealing seat, the valve body having a stem operating aperture disposed in a wall thereof and communicating with the flow passageway, and the valve body having an annular stem sealing seat facing the flow passageway and disposed in the stem operating aperture;
- an elastomeric sleeve bearing supported by the valve body in the flow passageway, the sleeve bearing having a pair of diametrally opposed bearing apertures;
- a disc shaft having a first end portion, a second end portion and a disc supporting portion, the first end portion supportingly disposed in and extending through one of the bearing aperture into the stem operating aperture, the second end supportingly disposed in the other bearing aperture, and the disc supporting portion disposed in the flow passageway;
- a disc supported by the disc supporting portion of the disc shaft in the flow passageway of the valve body, the disc positionable by rotation of the disc shaft in a passage sealing position and in a passage opening position, the disc having an annular flow sealing face facing the annular flow sealing seat when the disc is in the passage sealing position;
- disc sealing means for sealing the flow passageway between the disc and the annular flow sealing seat when the disc is in the passage sealing position; and
- an operating stem rotatably supported in the stem operating aperture and having an operating end and a stem engaging end, the operating stem having an annular stem sealing face facing the stem sealing seat, the stem engaging end engageable with the first end portion of the disc shaft so that rotation of the operating stem rotates the disc shaft, the operating stem having limited axial displacement toward the stem sealing seat and the disc shaft having limited downstream displacement under the pressure of fluid in the flow passageway in the event the sleeve bearing is destroyed so that the stem operating aperture and the flow passageway are sealed.

8. The valve of claim 7 wherein the stem engaging end of the operating stem has a tongue engaging channel, and wherein the first end of the disc shaft has a tongue extending therefrom that is slidingly receivable in the tongue engaging channel, the tongue engaging channel and the tongue being oriented to permit downstream displacement of the disc shaft when the disc is in the passage sealing position.

9. The valve of claim 8 wherein the operating end of the operating stem extends through the stem operating aperture to the exterior of the valve body.

10. The valve of claim 7 wherein the valve body has an access aperture extending through the wall of the valve body and the disc shaft is passable therethrough for assembling the disc shaft in the valve body, and wherein the valve further comprises plug means for sealing the access aperture when the disc shaft is positioned in the valve body.

11. The valve of claim 7 wherein the valve is further characterized as comprising:
- a bushing removably supported in the stem operating aperture and forming the annular stem sealing seat, the bushing having a second stem operating aperture through which the operating end of the operating stem extends in the assembled position thereof, the operating stem being passable through the stem operating aperture when the bushing is removed for assembling the operating stem in the valve body.

12. The valve of claim 11 comprising:
- seal means for sealing the second stem operating aperture about the operating stem.

13. The valve of claim 7 wherein the disc is characterized as having a loop connector having an aperture through which the disc shaft is passable, and locking means for locking the loop connector to the disc shaft in an assembled position thereof.

14. The valve of claim 7 further comprising an O-ring seal disposed in the disc shaft near each end thereof cooperatively with the sleeve bearing sealing against fluid flow through the bearing apertures.

15. The valve of claim 7 wherein the disc sealing means comprises an elastomeric ring seal supported by the sleeve bearing to sealingly engage the disc in the passage sealing position thereof.

16. The valve of claim 7 wherein the disc sealing means comprises an elastomeric ring seal sleeve supported by the inner surface of the sleeve bearing in the flow passageway, the ring seal sleeve forming an annular sealing seat facing the flow passageway to sealingly engage the disc in the passage sealing position thereof.

17. The valve of claim 16 wherein the ring seal sleeve is further characterized as forming an annular flange bead disposed to serve as a flange seal for the valve body.

18. The valve of claim 16 wherein the ring seal sleeve is further characterized as forming a shaft sealing bead disposed to seal against the disc shaft preventing fluid in the flow passageway from contacting the sleeve bearing.

* * * * *